C. MINAKER.
SPRING HUB FOR AUTOMOBILE WHEELS.
APPLICATION FILED AUG. 25, 1910.
1,004,455.
Patented Sept. 26, 1911.
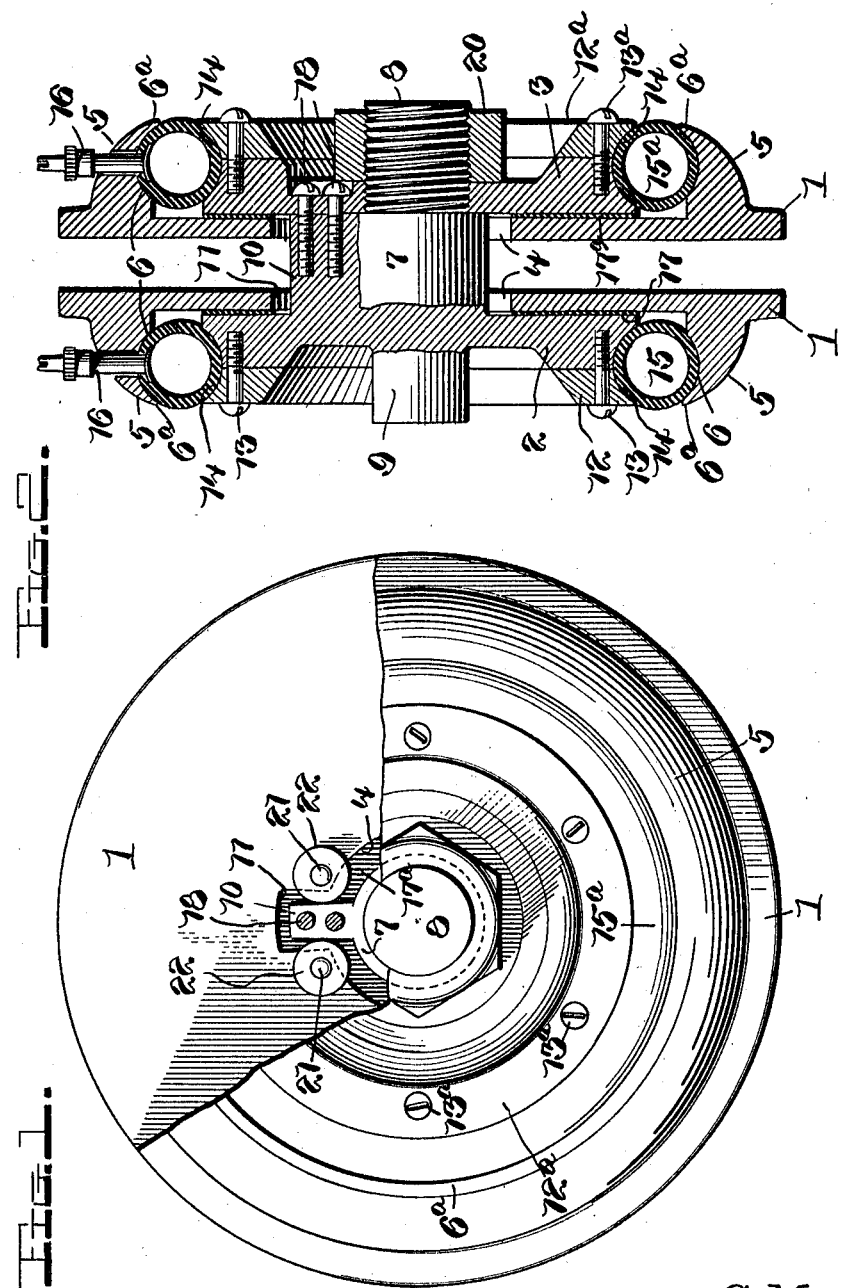
Witnesses
Chas. L. Guistauer.
M. X. Reeder.
Inventor
C. Minaker.
By Watson E. Coleman.
Attorney

UNITED STATES PATENT OFFICE.

CHAPMAN MINAKER, OF SYRACUSE, NEW YORK.

SPRING-HUB FOR AUTOMOBILE-WHEELS.

1,004,455. Specification of Letters Patent. Patented Sept. 26, 1911.

Application filed August 25, 1910. Serial No. 578,818.

*To all whom it may concern:*

Be it known that I, CHAPMAN MINAKER, a citizen of the United States, residing at Syracuse, in the county of Onondaga and State of New York, have invented certain new and useful Improvements in Spring-Hubs for Automobile-Wheels, of which the following is a specification, reference being had to the accompanying drawings.

This invention is an improved spring hub for a wheel such as an automobile wheel and to adapt the hub for spring movement so as to cause the vehicle to ride easily and without jolting, and to also render the use of a pneumatic tire on the wheel unnecessary, the invention consisting in the construction, combination and arrangement of devices hereinafter described and claimed.

In the accompanying drawings,—Figure 1 is partly an elevation and partly a sectional view of a yielding or spring hub constructed in accordance with my invention. Fig. 2 is a transverse sectional view of the same.

My improved yielding or spring hub comprises a pair of disks 1 for application to opposite sides of the spokes of a wheel, at the inner ends of the said spokes, and a pair of hub members 2—3. Each disk 1 is provided with a central circular opening 4 of suitable size, and each disk is also provided, on its outer side, with an inner concentrically located shoulder 5 which is provided with a concave groove 6 on its inner surface. The hub member 2 is provided on its inner side at its center with a cylindrical shaft member, here shown as a boss 7 provided at its outer end with a reduced screw threaded extension 8. The said hub section 2 is provided on its outer side with a centrally located shaft member 9 which may in practice be bored to receive one end of an axle shaft or automobile driving shaft. A radially disposed web or arm 10 projects from one side of and is here shown as formed integrally with the boss 7 and the hub section 2 and extends into radial openings 11 with which the disks 1 are provided. The said openings 11 are considerably wider than the said radial arm, web, or key 10, and their depth is such that a space is left between their inner ends and the outer side of the said web, arm or key so that provision is thus made for slight angular movement between the disks and the hub member 2 and also for radial movement between the said disks and the said hub member. The said hub member is provided on its outer side with a locking annulus 12 which is detachably secured thereto, as by means of screws 13. An annular space is formed between the shoulder 5 of the disk 1 which is associated with the hub member 2 and the periphery of the said hub member and the said locking annulus, and the said hub member and locking annulus are provided with a peripheral concave groove 14 corresponding with the groove 6 of the shoulder 5. A cushioning spring 15 which is annular in form is disposed between the periphery of the hub member 2 and the inner surface of the annular shoulder 5 and is seated in the said grooves 6—14. The said cushioning spring is in the embodiment of the invention here shown in the form of an annular flexible tube which may be made of rubber or of any other suitable elastic material and is inflated with compressed air, the said tubular cushioning spring being here shown as provided with a valved feed tube 16 of ordinary form to facilitate the inflation thereof. A gasket or washer 17 of suitable material is placed between the opposing surfaces of the hub member 2 and the disk 1 in which said hub member is associated.

The hub member 3 bears against the shoulder formed at one end of the boss 7 by the threaded reduced portion 8 and also bears against the end of the web, arm or key 10 and is secured to the said web, arm or key by means of screws 18 which admit of the detachment of the said hub member 3 from the hub member 2. The disk 1 with which the hub member 3 is associated is also provided on its outer side with an annular concentrically disposed shoulder 6ª corresponding with the shoulder 6, and the hub member 3 has a locking annulus 12ª corresponding with the locking annulus 12 and secured in place by means of screws 13ª. A pneumatic cushioning spring 15ª which corresponds with the cushioning spring 15 is disposed between the opposing shoulder 6ª and periphery of the hub member 3 and locking annulus 12ª. A gasket or washer 17ª, corresponding with the washer 17, is disposed between the opposing surfaces of the hub member 3 and the disk 1 with which it is associated.

A locking nut 20 is screwed on the threaded portion 8 of the shaft member or axle member of the hub and bears against the hub member 3 thereby coacting with the screws 18 to lock said hub member 3 to the hub member 2.

The disk 1 with which the hub member 3 is associated is provided, at opposite sides of the opening 11, with axle studs 21 on which are mounted rollers 22 which, in practice, are preferably made of rawhide or of some other exceedingly durable material which is yet flexible or yielding to a modified extent. These rollers form buffers and bear against opposite sides of the key 10 of the hub member 2 and prevent said hub member together with the hub member 3, which is secured thereto, from turning angularly with respect to the disk members 1 with which said hub members are associated, and since angular movement between the hub members and the disk members is thus prevented the pneumatic tubular cushioning springs are protected from disintegrating stresses which would otherwise be occasioned. Hence the said pneumatic cushioning springs are rendered exceedingly durable. It will be understood that the connection between the hub members and the disk members effected by the radially disposed key with which one of the hub members is provided and the buffer rollers which are mounted on one of the disks, in connection with the clearance openings 4 in the centers of the said disks, enable the disks and hub members to move radially to some extent with reference to each other and afford play for the pneumatic cushioning spring, the said pneumatic cushioning spring imparting spring motion to the wheel, hence causing a vehicle provided with wheels equipped with my improved hubs to ride very easily and smoothly and dispensing with the use of pneumatic tires on the peripheries of the wheels.

I do not desire to limit myself to the precise construction, combination and arrangement of devices herein shown and described, as it is evident that modifications may be made therein within the scope of my invention as defined by the appended claim.

Having thus described my invention, what I claim is:—

The herein described yieldable hub embodying a pair of spoke engaging disks each having a central opening and also having a radial recess communicating with the central opening, a pair of hub members disposed on the outer sides of the spoke engaging disks, one of the hub members having a central portion extending through the opening of the spoke engaging disks and also having a radially disposed key extending into the recess of the spoke engaging disks and further provided with a reduced threaded portion which extends through the other hub member, the last mentioned hub member bearing against the end of and being secured to the key of the other hub member, a nut on the reduced threaded portion of the first named hub member and bearing against the outside of the other hub member, cushioning rollers mounted on one of the hub engaging disks and bearing against opposite sides of the key and cushioning members between the spoke engaging disks and the hub member.

In testimony whereof I hereunto affix my signature in the presence of two witnesses.

CHAPMAN MINAKER.

Witnesses:
 GEO. S. LIVINGSTON,
 M. K. REEDER.

---

Copies of this patent may be obtained for five cents each, by addressing the "Commissioner of Patents, Washington, D. C."